US009912552B2

(12) United States Patent
Pok et al.

(10) Patent No.: US 9,912,552 B2
(45) Date of Patent: *Mar. 6, 2018

(54) METHOD AND APPARATUS FOR GENERATING CONFIGURATION INFORMATION FOR A COMMUNICATION SYSTEM

(71) Applicant: AT&T INTELLECTUAL PROPERTY I, LP, Atlanta, GA (US)

(72) Inventors: Chou Lan Pok, San Ramon, CA (US); Michael Raftelis, Austin, TX (US)

(73) Assignee: AT&T Intellectual Property I, L.P.

( * ) Notice: Subject to any disclaimer, the term of this patent is extended or adjusted under 35 U.S.C. 154(b) by 30 days.

This patent is subject to a terminal disclaimer.

(21) Appl. No.: 15/214,633

(22) Filed: Jul. 20, 2016

(65) Prior Publication Data

US 2016/0330085 A1 Nov. 10, 2016

Related U.S. Application Data

(63) Continuation of application No. 11/462,864, filed on Aug. 7, 2006, now Pat. No. 9,419,865.

(51) Int. Cl.
*H04L 12/66* (2006.01)
*H04L 12/24* (2006.01)

(52) U.S. Cl.
CPC ...... *H04L 41/5048* (2013.01); *H04L 41/0893* (2013.01); *H04L 41/5003* (2013.01); *H04L 41/5054* (2013.01)

(58) Field of Classification Search
CPC ..... H04L 41/0893; H04L 47/10; H04L 47/70; H04L 65/80; H04L 41/0806; H04L 41/5003; H04L 45/38; H04L 47/2416; H04L 47/24; H04L 47/2433; H04L 47/805; H04L 47/00; H04L 47/20
USPC .................................................. 370/352–356
See application file for complete search history.

(56) References Cited

U.S. PATENT DOCUMENTS

| | | | |
|---|---|---|---|
| 6,459,702 B1 | 10/2002 | Saaverda et al. | |
| 7,633,869 B1 * | 12/2009 | Morris | H04L 41/0896 370/232 |
| 2002/0075875 A1 | 6/2002 | Dravida et al. | |
| 2002/0101820 A1 | 8/2002 | Gupta et al. | |
| 2002/0101881 A1 | 8/2002 | Sundaresan et al. | |
| 2003/0012209 A1 | 1/2003 | Abdelilah | |
| 2004/0116117 A1 | 6/2004 | Ahvonen et al. | |
| 2004/0174823 A1 * | 9/2004 | Steele | H04L 41/5003 370/252 |
| 2005/0071267 A1 | 3/2005 | Takahashi et al. | |

(Continued)

*Primary Examiner* — Melanie Jagannathan
*Assistant Examiner* — Najeebuddin Ansari
(74) *Attorney, Agent, or Firm* — Guntin & Gust, PLC; Joseph Hrutka

(57) ABSTRACT

A method and apparatus for generating configuration information for a communication system is disclosed. An apparatus that incorporates teachings of the present disclosure may include, for example, a network policy manager can have a collection element that receives a plurality of service component definitions associated with a corresponding plurality of services of a communication system, a service bundle generation element that generates a plurality of service bundles from the plurality of service component definitions, and a policy element that determines a network configuration for each of the plurality of service bundles. Additional embodiments are disclosed.

20 Claims, 3 Drawing Sheets

(56) References Cited

U.S. PATENT DOCUMENTS

2006/0120393 A1 6/2006 Lee et al.
2006/0133274 A1 6/2006 Lee et al.
2006/0159106 A1 7/2006 Slyke et al.
2006/0233101 A1 10/2006 Luft et al.
2007/0250635 A1 10/2007 Hamilton et al.

* cited by examiner

100

METHOD AND APPARATUS FOR GENERATING CONFIGURATION INFORMATION FOR A COMMUNICATION SYSTEM

CROSS-REFERENCE TO RELATED APPLICATIONS

This application is a continuation of U.S. patent application Ser. No. 11/462,864, filed Aug. 7, 2006, now U.S. Patent Publication No. 2008/0043719. The contents of which are incorporated by reference herein in their entirety.

RELATED APPLICATION

U.S. patent application Ser. No. 11/462,853, filed Aug. 7, 2005, now U.S. Pat. No. 8,730,824, is incorporated herein by reference in its entirety.

FIELD OF THE DISCLOSURE

The present disclosure relates generally to communication systems, and more specifically to a method and apparatus for generating configuration information for a communication system.

BACKGROUND

Providers of communication services today manually enter service bundle definitions and associated network configuration information for enabling service bundles in a communication system. As high bandwidth infrastructure such as fiber to the curb or home (FTTC or FTTH) continues to be deployed, the number of service bundles possible grows rapidly. Consequently, entering a large volume of service bundle definitions and corresponding network configuration manually can be error prone and inefficient.

A need therefore arises for a method and apparatus for generating configuration information for a communication system.

DETAILED DESCRIPTION

Embodiments in accordance with the present disclosure provide a method and apparatus for generating configuration information for a communication system.

In a first embodiment of the present disclosure, a network policy manager (NPM) can have a collection element that receives a plurality of service component definitions associated with a corresponding plurality of services of a communication system, a service bundle generation element that generates a plurality of service bundles from the plurality of service component definitions, and a policy element that determines a network configuration for each of the plurality of service bundles.

In a second embodiment of the present disclosure, a computer-readable storage medium can have computer instructions for generating a plurality of service bundles from a plurality of service component definitions associated with a corresponding plurality of services of a communication system, and determining a network configuration for each of the plurality of service bundles.

In a third embodiment of the present disclosure, a method can have the step of generating a network configuration for each of a plurality of service bundles determined from a plurality of service component definitions associated with a corresponding plurality of services of a communication system.

Figure 1:
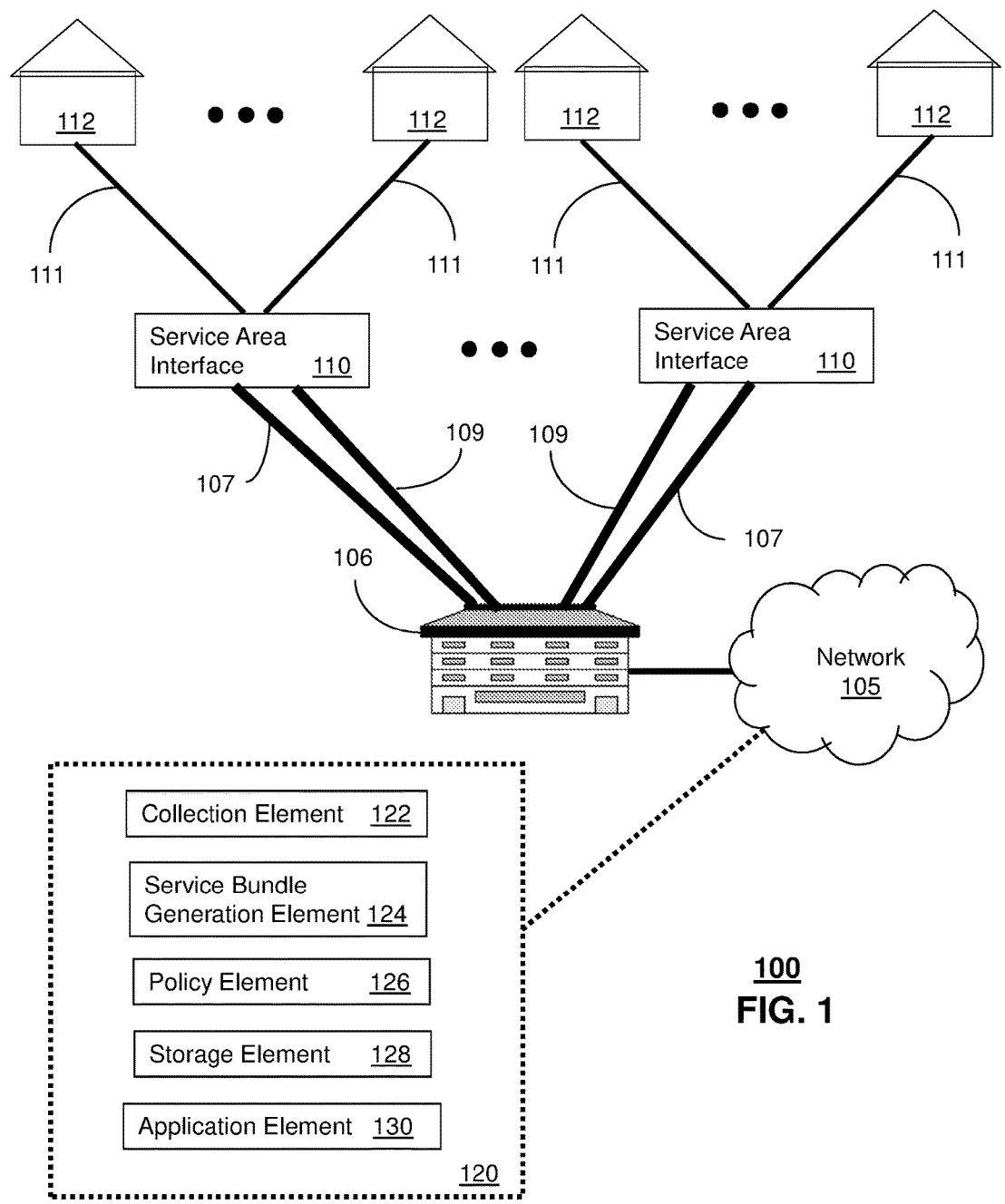
FIG. 1 depicts an exemplary block diagram of a communication system.
Figure 2:
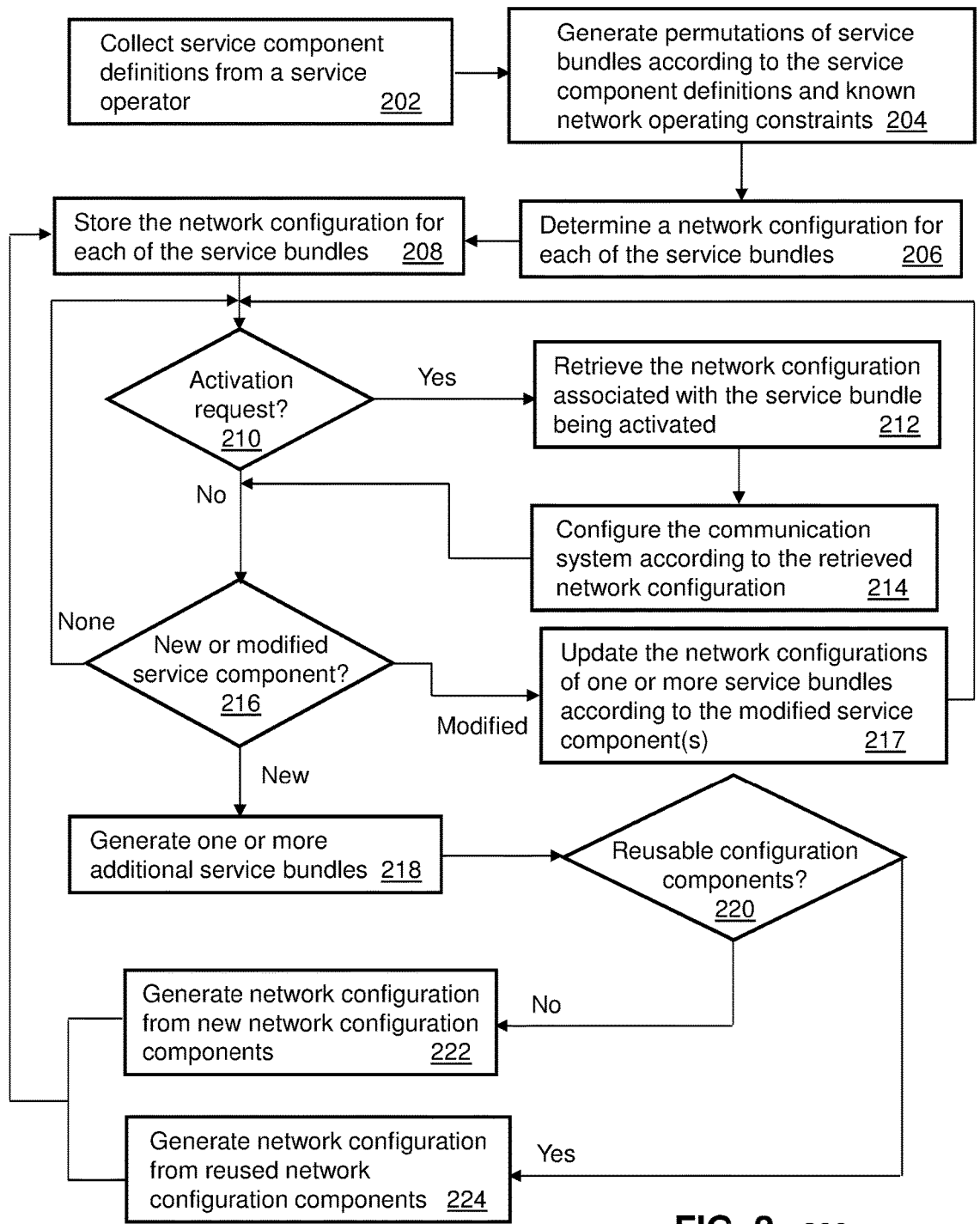
FIG. 2 depicts an exemplary method operating in the communication system.

FIG. 1 depicts an exemplary block diagram of a communication system 100. The communication system 100 comprises a central office (CO) 106 and a plurality of service area interfaces (SAIs) 110 each coupled to a plurality of buildings 112. The CO 106 houses common network switching equipment for distributing local and long-distance telecommunication services supplied by network 105 to buildings 112 (such as dwellings or commercial enterprises) by way of the SAI 110. For illustration purposes only, buildings 112 will be referred to herein as residences 112. Telecommunication services of the CO 106 can include traditional circuit-switched services such as POTS (Plain Old Telephone Service) and/or packet-switched services such as HDTV, VoIP (Voice over Internet Protocol), IPTV (Internet Protocol Television), and Internet data supplied to a residence 112 by way of for example very high bit rate DSL (VDSL) technology operating over legacy twisted pair cable lines 111.

Links 107 can be twisted copper pairs for distributing power to the SAIs 110. The SAI 110 can be coupled to optical and/or electrical cables 109 supplied by the CO 106, which carries any one or more of the aforementioned communications services. These services can be processed in part by active circuits in the SAI 106 and/or circuits at the residences 112. Each cable 109 carries communication lines numbering in the tens or hundreds. The SAI 110 serves to distribute portions of the communication cables 109 among the residences 112 as dedicated communication links 111. Thus, the SAI 110 serves as a local cross-connect system for unbundling communication lines in cable 109.

Figure 3:
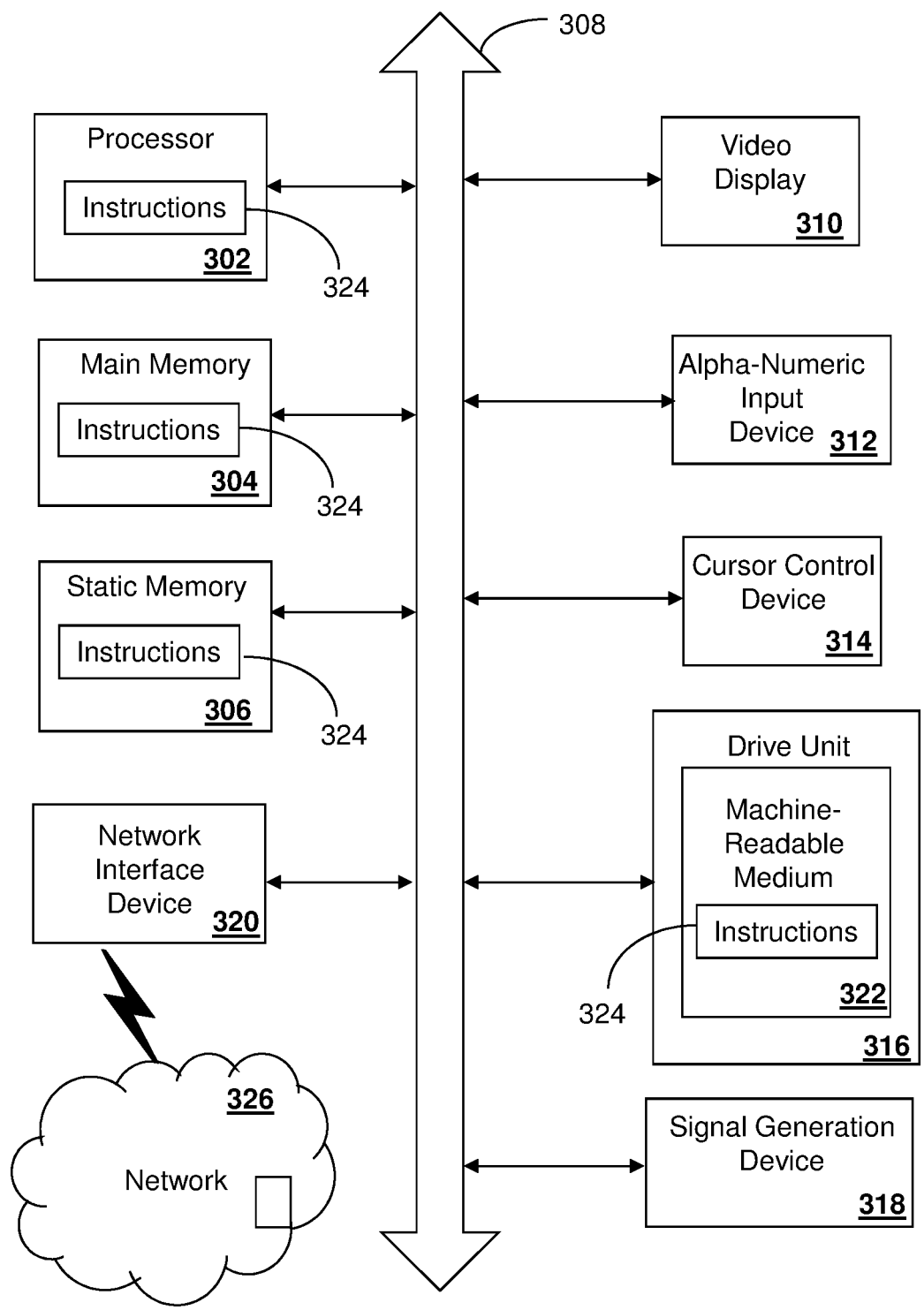
FIG. 3 is a diagrammatic representation of a machine in the form of a computer system within which a set of instructions, when executed, may cause the machine to perform any one or more of the methodologies discussed herein.

The communication system 100 can further include a network policy manager (NPM) 120. The NPM 120 can be utilized for establishing and activating service bundles according to associated network configurations. To accomplish these tasks, the NPM 120 can comprise a collection element 122, a service bundle generation element 124, a policy element 126, a storage element 128, and an application element 130. Elements 122-130 can be implemented in software and/or hardware and can operate independently in remote locations from each other, or collectively as a single system in one location. FIG. 3 depicts an exemplary method 200 operating in the NPM 120 and other portions of the communication system 100. In a software implementation, one or more of the elements 122-130 can be implemented in a non-transitory computer or machine readable medium.

Method 200 begins with step 202 in which the collection element 122 receives a number of service component definitions associated with services of the communication system 100. For example, a service component definition can define business rules for operating a Voice over IP (VoIP) service in the communication system 100. The business rules can establish that a VoIP service is to have priority over other IP traffic. Other service component definitions can represent variants of IPTV service such as standard-definition television (SDTV) and high-definition television (HDTV). Service component definitions can also be used for defining various forms of Internet service (low, mid and high-speed) as well as portal services (retail, auctioning, travel, etc.). Generally speaking, there are limitless service component definitions that can be supplied by the operator of the communication system 100 to the collection element 122 of the NPM 120.

Once the service components definitions have been collected, the NPM 120 can proceed to step 204 where the service bundle generation element 124 generates all possible permutations of service bundles that can be derived from the total set of service component definitions supplied by the service provider in step 202 according to known network operating constraints of the communication system 100. A network operating constraint can represent any known limitation of the communication system 100 such as, for example, the bandwidth capacity or network topology of the communication system. Step 206, among other aspects of method 200, sets the NPM 120 apart from prior art systems which rely on the service operator to define service bundles as well as its corresponding service components.

Once the service bundles have been generated, the NPM 120 proceeds to step 206 where the policy element 126 determines a network configuration for each of the service bundles. The network configuration can be represented by a number of network configuration components such as a Quality of Service (QOS) policy, a security policy, a queuing policy, and a portal redirect policy—just to name a few. These policies can be predefined by the service operator according to the network operating constraints of the communication system 100. For example, depending on network capacity, network topology, and network design (e.g., a multi-protocol label switching network versus an asynchronous transfer mode network, or combinations thereof), the aforementioned policies can be preconfigured according to objectives established by the service provider such as managing profitability, cost, quality, performance, and security in the communication system 100.

After a network configuration is determined for each of the service bundles in step 206, the storage element 128 is called on in step 208 to store the network configuration for each service bundle according to an identifier established for each service bundle for ease of retrieval. With the service bundles and corresponding network configurations identified, the NPM 120 proceeds to step 210 where it checks for an activation request for a customer. This step can represent the selection by an existing or prospective customer of one of the service bundles offered to subscribers of the communication system 100. The selection process can result from the customer interacting with an agent of the service provider guiding said customer through a number of service bundle options offered by the communication system 100.

When an activation request is detected, the NPM 120 proceeds to step 212 where it invokes the application element 130 to retrieve a network configuration associated with the selected service bundle according to its corresponding identification. In step 214, the application element 130 configures the communication system 100 according to the retrieved configuration. This step can represent a process for configuring for example a residential gateway residing in the customer's residence 112 and any number of intermediate network elements operating in the communication system 100 such as a digital subscriber line access multiplexer (DSLAM) for configuring a VDSL interface to the residence, a service switching point (SSP), an IP multimedia subsystem (IMS), routers in network 105, and so on.

From step 210 or 214 NPM 120 proceeds to step 216 where it invokes the collection element 122 to check for new or modified service component definitions supplied by the service operator. If no new or modified service component definitions have been supplied, the NPM 120 returns to step 210 to check for addition service activation requests. If on the other hand one or more modified service component definitions have been supplied by the service operator, the NPM 120 proceeds to step 217 where it updates the network configurations of one or more service bundles affected by the modified service components.

If instead one or more new service component definitions have been supplied by the service operator, the NPM 120 proceeds to step 218 where the service bundle generation element 124 generates one or more additional service bundles according to the new service component definition(s) supplied by the service operator managing the communication system 100. Each service component definition can represent a new communication service not previously supported by the communication system 100, or a variant of an existing service. For example, a previous instance of Internet services may have provided two bandwidth options. As a result of improvements made to the communication system 100, the service operator may now be able to provide three or more bandwidth options leading up to the new service component definitions supplied in step 216.

In step 220, the policy element 126 checks whether there are reusable network configuration components for the new service bundles generated in step 218. If no reusable components are found, the policy element 126 proceeds to step 222 where it generates a new network configuration; otherwise, the policy element 126 proceeds to step 224 where it generates the network configuration for each of the additional service bundles from reused network configuration components. In cases where some but not all network configuration components can be reused, the policy element 126 can generate a network configuration according to a combination of steps 222-224. That is, for each new service bundle the policy element 126 can reuse some network configuration components and create others or request that the service provider provide new network configuration components to support these new services. Once the new service bundles and corresponding network configurations have been generated, the NPM 120 proceeds to step 208 where the storage element 128 stores said bundles and configurations as noted earlier for future use in steps 210-214.

It would be evident to an artisan with ordinary skill in the art that the aforementioned embodiments of method 200 can be modified, reduced, or enhanced without departing from the scope and spirit of the claims described below. For example, Steps 202-208 describe a means to pre-configure the NPM 120 with network configurations for each of the possible service bundles. Alternatively, a network configuration can be determined for a given service bundle on demand. In this embodiment, method 200 can proceed from step 202 directly to step 210 where the NPM 120 is directed to check for activation of a particular service bundle (that was not previously determined by the NPM 120). With the advent of high speed computing technologies, a network configuration can be determined on demand for a select service bundle according to service component definitions associated with the service bundle in question. The foregoing embodiment can save memory resources in the NPM 120 and minimize or eliminate the need for complex database applications to store large permutations of service bundles and their corresponding network configurations.

This is but one example of many modifications that can be applied to the present disclosure without departing from the scope of the claims set forth below. Accordingly, the reader is directed to the claims below for a fuller understanding of the breadth and scope of the present disclosure.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network policy manager, comprising:
    a processing system including a processor; and
    a memory that stores executable instructions that, when executed by the processing system, facilitate performance of operations, comprising:
        receiving a plurality of service component definitions associated with a corresponding plurality of services of a communication system, wherein the plurality of service component definitions includes a new service component definition;
        generating permutations of service bundles derived from the plurality of service component definitions and according to network operating constraints, wherein the network operating constraints comprise a bandwidth capacity of the communication system;
        determining a network configuration for each permutation of the permutations of the service bundles, wherein the network configuration of each permutation of the permutations of the service bundles comprises a plurality of network configuration components;
        receiving an activation request associated with a select permutation of the permutations of service bundles;
        determining if reusable network configuration components are available; and
        generating additional service bundle permutations according to the new service component definition, wherein the generating comprises reusing network configuration components responsive to determining that the reusable network configuration components are available,
    wherein the network configuration for each permutation of the permutations of service bundles comprises one of a Quality of Service policy, a security policy, a queuing policy, or a portal redirect policy.

2. The network policy manager of claim 1, wherein each of the service component definitions comprises business rules for configuring the service associated with the service component definition.

3. The network policy manager of claim 1, wherein the network operating constraints comprise a network topology of the communication system.

4. The network policy manager of claim 1, wherein the plurality of services comprise one of a voice over internet protocol service, an internet protocol television service, an Internet service, or a portal service.

5. The network policy manager of claim 1, wherein the operations further comprise:
    storing the network configuration for each permutation of the permutations of service bundles; and
    retrieving the network configuration associated with the select permutation of the permutations of service bundles as a retrieved network configuration.

6. The network policy manager of claim 5, wherein the operations further comprise configuring the communication system according to the retrieved network configuration.

7. The network policy manager of claim 1, wherein the determining the network configuration further comprises determining a network configuration for each of the additional service bundle permutations.

8. The network policy manager of claim 1, wherein the receiving the plurality of service component definitions further comprises receiving a modified service component definition.

9. The network policy manager of claim 8, wherein the determining a network configuration further comprises updating network configurations affected by the modified service component definition.

10. A non-transitory, machine-readable storage medium, comprising executable instructions that, when executed by a processing system including a processor, facilitate performance of operations, comprising:
    receiving a plurality of service component definitions associated with a corresponding plurality of services of a communication system, wherein the plurality of service component definitions includes a new service component definition;
    generating permutations of service bundles derived from the plurality of service component definitions according to known network operating constraints, wherein the network operating constraints comprise a bandwidth capacity of the communication system;
    determining a network configuration for each permutation of the permutations of service bundles according to the plurality of service component definitions, wherein the network configuration of each service bundle comprises a plurality of network configuration components;
    receiving an activation request associated with a select permutations of the permutations of service bundles for a select customer;
    determining if reusable network configuration components are available; and
    generating additional service bundles according to the new service component definition by reusing network configuration components responsive to determining that the reusable network configuration components are available,
    wherein the network configuration for each permutation of the permutations of service bundles comprises one of a Quality of Service policy, a security policy, a queuing policy, or a portal redirect policy.

11. The non-transitory, machine-readable storage medium of claim 10, wherein each of the service component definitions comprises business rules for configuring the service associated with the service component definition.

12. The non-transitory, machine-readable storage medium of claim 10, wherein the plurality of services comprise one of a voice over internet protocol service, an internet protocol television service, an Internet service, or a portal service.

13. The non-transitory, machine-readable storage medium of claim 10, wherein the operations further comprise:
   storing the network configuration for each permutation of the permutations of service bundles according to an identifier associated with each permutation of the permutations of service bundles; and
   retrieving the network configuration associated with the select permutation according to a corresponding identifier for the select permutation as a retrieved network configuration.

14. The non-transitory, machine-readable storage medium of claim 13, wherein the operations further comprise configuring the communication system according to the retrieved network configuration for the select customer.

15. The non-transitory, machine-readable storage medium of claim 10, wherein the operations further comprise determining a network configuration for each of the additional service bundles by reusing a respective one of the plurality of network configuration components.

16. The non-transitory, machine-readable storage medium of claim 15, wherein the operations further comprise receiving an activation request associated with a select permutation of the permutations of service bundles.

17. The non-transitory, machine-readable storage medium of claim 10, wherein the operations further comprise generating a new network configuration responsive to the determining if reusable network configuration components are not available.

18. A method, comprising:
   receiving, by a processing system comprising a processor, a plurality of service component definitions associated with a corresponding plurality of services of a communication system, wherein the plurality of service component definitions includes a new service component definition;
   generating, by the processing system, permutations of service bundles derived from the plurality of service component definitions according to network operating constraints, wherein the network operating constraints comprise a bandwidth capacity of the communication system;
   generating, by the processing system, a network configuration for each one of the permutations of service bundles, wherein the network configuration of each service bundle comprises a plurality of network configuration components;
   receiving, by the processing system, an activation request associated with a select permutation of the permutations of service bundles;
   determining if reusable network components are available; and
   generating, by the processing system, additional service bundles according to the new service component definition, wherein the generating comprises reusing network configuration components responsive to determining that the reusable network components are available,
   wherein the network configuration for each permutation of the permutations of service bundles comprises one of a Quality of Service policy, a security policy, a queuing policy, or a portal redirect policy.

19. The method of claim 18, further comprising storing the network configuration for each permutation of the permutations of service bundles.

20. The method of claim 18, further comprising:
   retrieving the network configuration associated with the select permutation of the permutations of service bundles as a retrieved network configuration; and
   configuring the communication system according to the retrieved network configuration.

* * * * *